(12) United States Patent
Katano (10) Patent No.: US 7,241,383 B2
(45) Date of Patent: Jul. 10, 2007

(54) FLUID TREATING METHOD AND APPARATUS

(75) Inventor: Yoshinao Katano, Gunma (JP)

(73) Assignee: TOA Engineering Co., Ltd., Gunma (JP)

( * ) Notice: Subject to any disclaimer, the term of this patent is extended or adjusted under 35 U.S.C. 154(b) by 250 days.

(21) Appl. No.: 10/792,039

(22) Filed: Mar. 3, 2004

(65) Prior Publication Data

US 2004/0168986 A1    Sep. 2, 2004

Related U.S. Application Data

(63) Continuation of application No. PCT/JP03/00741, filed on Jan. 27, 2003.

(30) Foreign Application Priority Data

Jan. 31, 2002    (JP) .............................. 2002-024691

(51) Int. Cl.
*B01D 25/176*    (2006.01)
*B01D 25/32*    (2006.01)
*B01D 25/38*    (2006.01)
*B01D 35/06*    (2006.01)

(52) U.S. Cl. .................... 210/223; 210/323.1; 210/331; 210/332; 210/333.01; 210/351; 210/352; 210/356; 210/411

(58) Field of Classification Search ............... 210/223, 210/322.1, 331, 332, 333.01, 351, 352, 356, 210/411, 453, 323.1
See application file for complete search history.

(56) References Cited

FOREIGN PATENT DOCUMENTS

| JP | 59-132911 A | 7/1984 |
|---|---|---|
| JP | 62-14911 A | 1/1987 |
| JP | 63-126509 A | 5/1988 |
| JP | 6-154515 A | 6/1994 |
| JP | 10-52608 A | 2/1998 |

OTHER PUBLICATIONS

Patent Abstracts of Japan-English Abstract and Constitution for Japanese Unexamined Patent Application No. 63-126509, published May 30, 1988.*
Patent Abstracts of Japan-English Abstract and Constitution for Japanese Unexamined Patent Application No. 59-132911, published Jul. 31, 1984.*
PTO:2006-6884-Translation of Japanese Unexamined Patent Application No. 59-132911 published Jul. 31, 1984.*
International Search Report dated May 13, 2003 (1 page).

* cited by examiner

*Primary Examiner*—David A. Reifsnyder
(74) *Attorney, Agent, or Firm*—Akin Gump Strauss Hauer & Feld LLP (57) ABSTRACT

A fluid treatment method includes the steps of forming a ring lamination by laminating a plurality of filtering rings with contact surfaces facing each other in a laminating direction; providing at least portions of the filtering rings with a contact surface roughness (Ra) in a range of about 0.01 μm to 20 μm; pressing the ring lamination under a contact surface pressure (p) within a range from 0 to 177 kg/cm$^2$ in the laminating direction of the filtering rings to cause the contact surfaces to closely adhere to each other; directing an object fluid into gaps formed by contact surfaces of neighboring filtering rings of the ring lamination; and dividing the object fluid into a first separated fraction and a second separated fraction for separation. An apparatus for carrying out the method includes a ring lamination, a housing therefor, a ring press for acting on the ring lamination under a prescribed pressure, an object fluid source, and a pressure source for impressing a prescribed pressure on the object fluid.

9 Claims, 11 Drawing Sheets

FLUID TREATING METHOD AND APPARATUS

CROSS-REFERENCE TO RELATED APPLICATION

This is a continuation of International Patent Application PCT/JP03/00741, filed Jan. 27, 2003, the disclosure of which is incorporated herein by reference.

BACKGROUND OF THE INVENTION

The present invention relates to a fluid treating method and a fluid treating apparatus for discriminating a prescribed substance from the other constituents in a fluid to be treated (hereinafter referred to as "an object fluid"), such as a liquid suspension substance or sea water containing an electrolytic ion substance, and for separating and dividing the substance, by using a ring lamination formed of a plurality of filtering rings.

As a filtering apparatus for separating an object fluid which is a liquid suspension substance, such as a solid-liquid slurry material, into purified water and solids, the following apparatuses have conventionally been used:

(1) A vacuum-rotation-type apparatus in which a filter cloth and a steel wire are wound on a rotary drum to carry out dehydration by means of vacuum from the interior and then scraping off external residues;

(2) A filter press which pressure-feeds target slurry by a pump pushing the slurry into a filter block and opening the blocks at the maximum quantity of dehydrated cakes to scrape off the cakes;

(3) A screw press which charges target slurry through an inlet port into the press, discharges water and liquid through outside meshes, and delivers cakes through a following restricting port;

(4) A centrifugal separator in which target slurry is charged into the separator, and from which the load classified by weight is taken out by rotating the separator at a high speed; and (5) A belt roller dehydrator which dehydrates a fluid under the pressing pressure of the roller.

These conventional apparatuses have respective problems and are not as yet sufficiently satisfactory. The vacuum-rotation apparatus, in which dehydration is accomplished under a negative pressure, is not suitable for the purpose of reducing the water content. The filter press, having the highest dehydrating capability, requires much labor for scraping off dehydrated cakes for disposal. The screw press, convenient for carrying out rough dehydration, requires a secondary treatment of the residual liquid. The centrifugal separator, although permitting achievement of dehydration, has a very poor yield, because classification residues remain in the solution. The belt roller dehydrator, compact in size and convenient to use, cannot treat return water resulting from roller release, leading to a low yield.

There is proposed a filtering apparatus comprising a laminated filter formed by laminating a plurality of flat filtering materials, for introducing an object fluid in a direction perpendicular to the laminating direction of the filtering materials, and for filtering the object fluid while causing the fluid to pass through the flat filtering materials.

Figure 11:
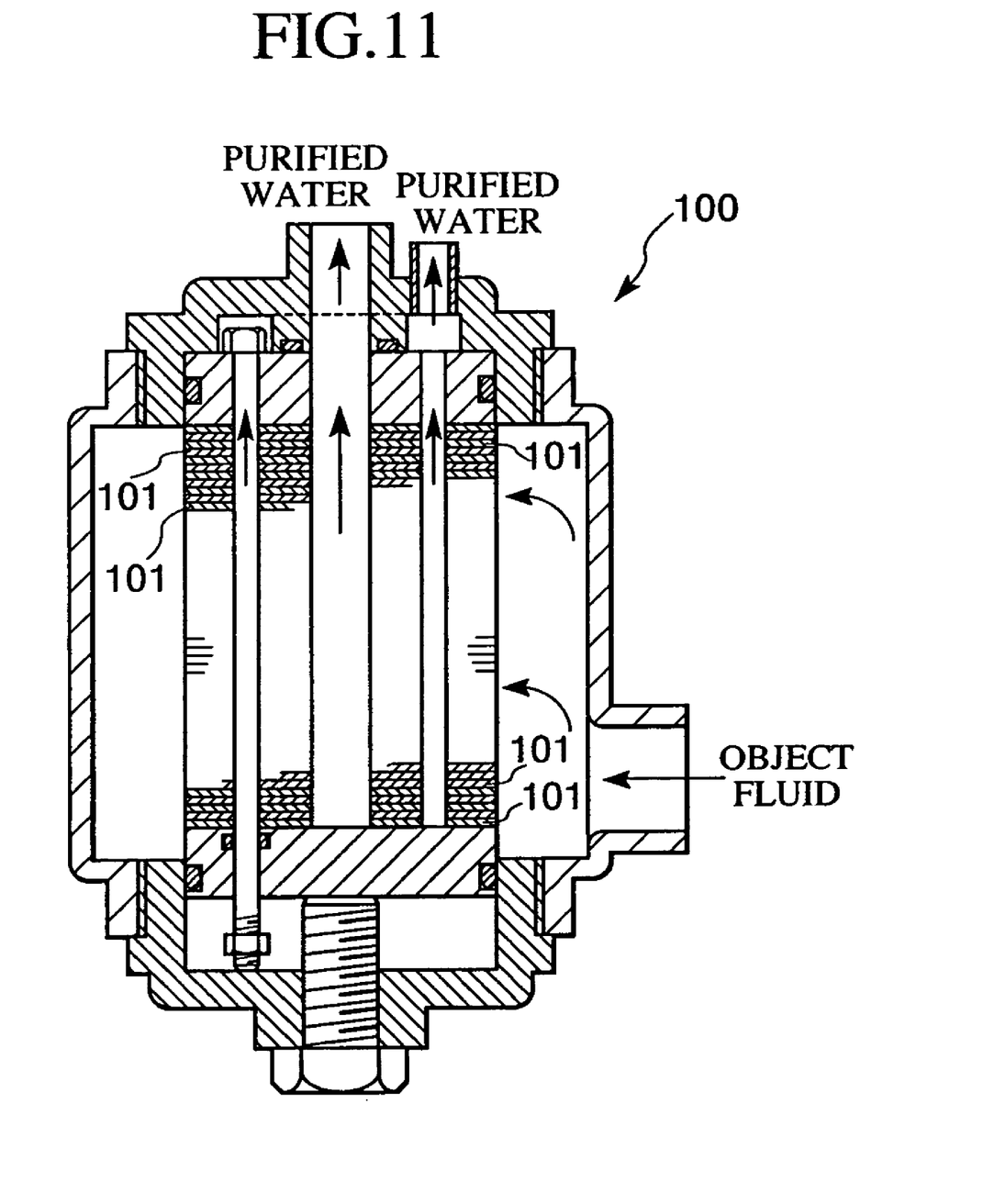
FIG. 11 is a schematic configuration diagram illustrating a typical conventional fluid treating apparatus.

For example, Japanese Patent Application Laid-open No. 10-52608 discloses, as shown in FIG. 11 attached hereto, a laminated filter 100 for use in filtration of sewage and liquid waste, comprising a plurality of ring-shaped flat filtering materials 101 closely adhering to each other, laminated separably at contact surfaces thereof, so that suspended substances of sewage or liquid waste flow and pass through the gap on the contact surfaces.

However, a conventionally proposed flat filtering material 101 used in a filtering apparatus or a laminated filter disclosed in Japanese Patent Application Laid-open No. 10-52608 is a porous filtering material. Particles of the suspended substance passing through the gap of the contact surfaces adhere to the surface of the porous filtering material 101 and are accumulated in fine pores of the filtering material, leading to lower filtering performance. To avoid such inconvenience, it is necessary to frequently carry out a so-called backwashing operation for causing a backward flow of the filtering liquid to remove particles accumulated in these fine holes. When clogging of the porous filtering material occurs, the regenerative rate of such backward washing is low, requiring washing with chemicals or replacement.

BRIEF SUMMARY OF THE INVENTION

An object of the present invention is therefore to provide a fluid treating method and a fluid treating apparatus which are very high in efficiency and can divide an object fluid into a first separated fraction and a second separated fraction and separate these fractions from each other.

Another object of the present invention is to provide a fluid treating method and a fluid treating apparatus which can withstand high temperatures and high pressures and are resistant to acid and alkali.

Still another object of the present invention is to provide a fluid treating method and a fluid treating apparatus which permit a backwashing step by simple operation and are high in operability.

A further object of the present invention is to provide a fluid treating method and a fluid treating apparatus which permit setting of various target widths as desired and are used for multiple purposes.

Still another object of the present invention is to provide a fluid treating method and a fluid treating apparatus which are simple in configuration, compact in size so as to achieve space-saving and energy-saving, and permit a considerable reduction of equipment and running costs as compared with the conventional apparatuses.

The above-mentioned objects can be achieved by the fluid treating method and the fluid treating apparatus of the present invention. In summary, according to the invention, there is provided a fluid treating method comprising the steps of forming a ring lamination by laminating a plurality of filtering rings with contact surfaces facing each other in the laminating direction; providing at least portions of the contact surfaces of the filtering rings with a surface roughness (Ra) in a range of about 0.01 μm to 20 μm; pressing the ring lamination under a contact surface pressure (p) in a range of about 0 to 177 kg/cm$^2$ in the laminating direction of the filtering rings to cause the contact surfaces to closely adhere to each other; directing an object fluid into gaps formed by contact surfaces of neighboring filtering rings of the ring lamination; and dividing the object fluid into a first separated fraction and a second separated fraction for separation.

According to one embodiment of the fluid treating method of the present invention, the distance (g) between contact surfaces of the filtering rings closely adhering to and facing each other is in a range of about 0.2 nm to 200 μm.

According to another embodiment of the fluid treating method of the present invention, the filtering ring is manufactured from a magnetic material.

According to still another embodiment of the fluid treating method of the present invention, the accuracy and/or the speed for division and separation of the object fluid into the first separated fraction and the second separated fraction are controlled by adjusting a difference $\Delta P=P1-P2$ between a supply pressure P1 of the object fluid to an inlet area of the ring lamination and a suction pressure P2 acting on an exit area of the ring lamination.

According to a further embodiment of the invention, it is desirable that the fluid treating method further comprise the steps of: causing the suction pressure acting on the exit area of the ring lamination to act in the reverse direction in the initial stage of operation, and pressing the object fluid in the ring lamination by the reverse suction pressure acting on the exit area of the ring lamination and the supply pressure of the object fluid to the inlet area of the ring lamination.

The present invention also provides a fluid treating apparatus which divides an object fluid into a first separated fraction and a second separated fraction and separates these fractions, the apparatus comprising:

a long and thin cylindrical housing;

a ring lamination formed by laminating a plurality of filtering rings facing each other;

a ring press for acting on the ring lamination to cause the filtering rings to closely adhere to each other under a prescribed pressure;

an object fluid supply for feeding the object fluid to the ring lamination; and an object fluid pressure source for impressing a prescribed pressure onto the object fluid supplied to the ring lamination in cooperation with the object fluid supply.

According to one embodiment of the fluid treating apparatus of the present invention, the object fluid pressure source is a pump or sluice valve.

According to another embodiment of the fluid treating apparatus of the present invention, at least the portions of the filtering rings closely adhering to and facing each other have a surface roughness (Ra) in a range of about 0.01 μm to 20 μm.

According to still another embodiment of the fluid treating apparatus of the present invention, the ring press presses the ring lamination under a pressure within a range from 0 to 177 kg/cm2.

According to a further embodiment of the fluid treating apparatus of the present invention, the distance between surface contact portions of the filtering rings adhering to and facing each other is in a range of about 0.2 nm to 200 μm.

According to further another embodiment of the fluid treating apparatus of the present invention, the filtering ring comprises a magnetic material.

According to another embodiment of the fluid treating apparatus of the present invention, the apparatus further comprises a stripper arranged in a center hole formed in the ring lamination. The above-mentioned stripper is suitably a rotary brush for removing solids adhering to the inner peripheral portion of the ring lamination.

According to another embodiment of the fluid treating apparatus of the present invention, the apparatus further comprises a ring lamination holder arranged in the housing and provided with the ring lamination in the interior thereof and with a plurality of openings.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

FIRST EMBODIMENT

Figure 1:
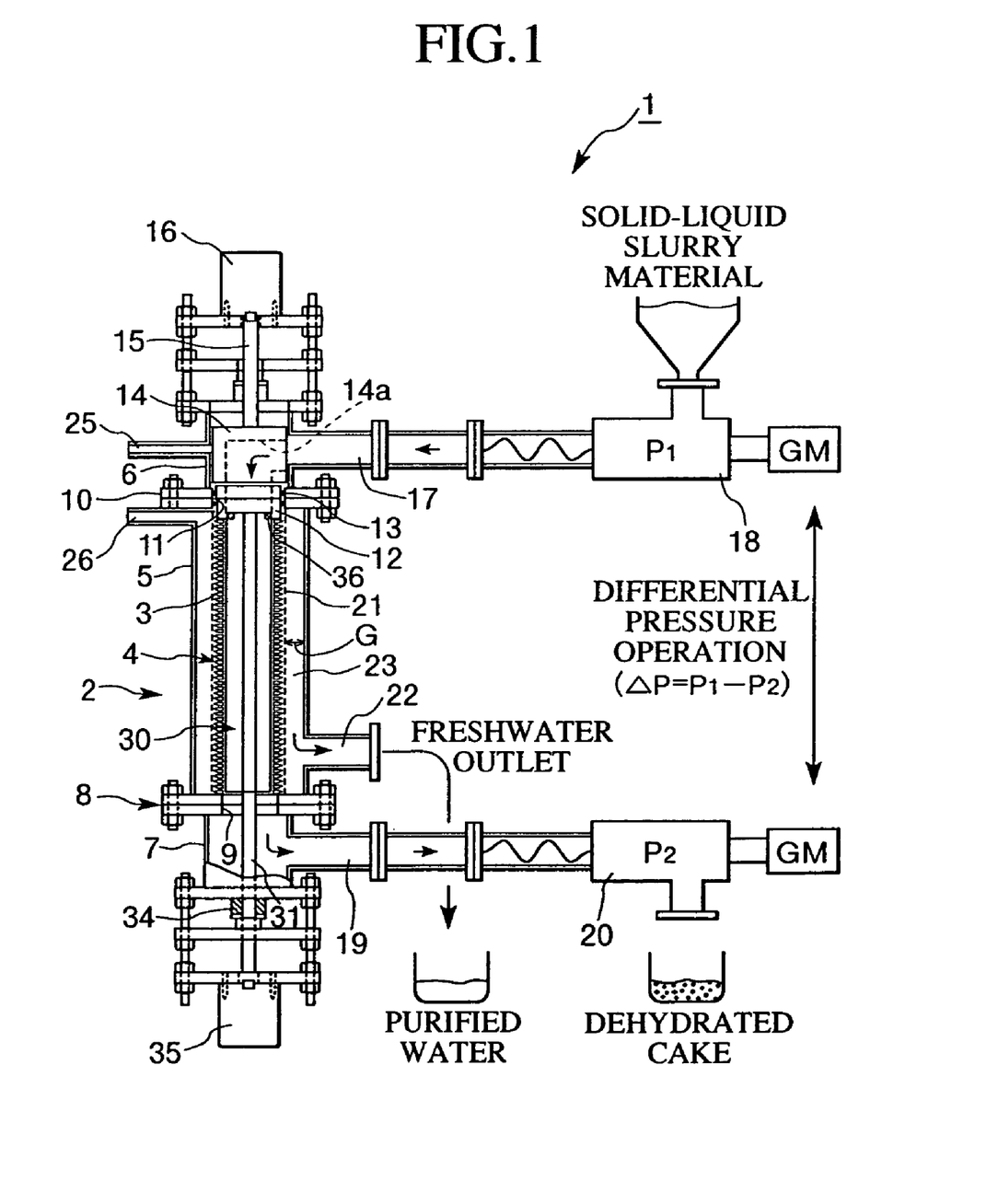
FIG. 1 is a schematic configuration diagram of an embodiment of the fluid treating apparatus of the present invention.

FIG. 1 illustrates a schematic configuration of an embodiment of the fluid treating apparatus adapted to implement the fluid treating method of the present invention.

The fluid treating method of the present invention comprises the steps of forming a ring lamination by laminating a plurality of filtering rings with contact surfaces facing each other; pressing the ring lamination under a prescribed pressure in a laminating direction of the filtering rings to closely adhere the contact surfaces; directing an object fluid into gaps formed by contact surfaces of neighboring filtering rings of the ring lamination; and dividing the object fluid into a first separated fraction and a second separated fraction and separating the same.

According to the method of the present invention, as described later in detail, the surface finishing accuracy of at least the portion of the filtering rings closely adhering to each other and facing each other, i.e., the surface roughness Ra (center line average roughness) is in a range of about 0.01 μm to 20 μm, preferably about 0.1 μm to 20 μm; and the pressing force of the ring lamination, as typically represented by the pressure p on the contact surfaces of neighboring filtering rings, is in a range of about 0 to 177 kg/cm2, preferably about 8 to 80 kg/cm². The separating accuracy or the treating speed can be changed by altering this pressing force, and the fluid treating method of the present invention is applicable for a plurality of purposes. The filtering ring should preferably be manufactured from a magnetic material. This will be described later in detail.

Since the fluid treating method of the present invention is most commonly used as a filtering method for filtering and separating solids from an object fluid, such as a fluid suspended substance, the fluid treating apparatus 1 in this embodiment shown in FIG. 1 will be described as a filtering apparatus for separating a prescribed substance from an object fluid.

The filter apparatus 1 of this embodiment is assumed to be an upright-type apparatus having a vertical axis to simplify description. The filter apparatus 1 is not however limited to this, but it should be understood that the filter apparatus 1 may be horizontally arranged, or may be arranged at a prescribed angle.

According to this embodiment, the filter apparatus 1 has a long and thin cylindrical housing 2. In this embodiment, the housing 2 comprises a main body casing 5, forming a substantial filtering operation area having a ring lamination 4 formed by laminating a plurality of filtering rings 3 in the longitudinal axis direction of the housing 2; an inlet casing 6 located above the operation area, forming an inlet area; and an exit area 7 located below the operating area, forming an exit area.

The lower end in the axial direction of the ring lamination 4 is brought into contact with and held by a stop flange 8 having a hole 9 at the center and connecting the main body casing 5 and the exit casing 7. The other end, i.e., the upper end of the ring lamination 4 is in contact with a pressing ring 12 arranged slidably in the axial direction in a connecting flange 10 having a hole 11 at the center and connecting the main body casing 5 and the inlet casing 6. An O-ring 13 is arranged on the outer peripheral surface of the pressing ring 12 and maintains a liquid-tight state between the sliding sections of the pressing ring 12 and the connecting flange 10.

A piston 14 is arranged in the inlet casing 6. The piston 14 is connected to a press drive 16, such as an air cylinder, via a connecting rod 15. The piston 14 acts on the pressing ring 12 and presses the pressing ring 12 toward the ring lamination 4. More specifically, the press drive 16, the piston 14 and the pressing ring 12 act on the ring lamination 4 and serve as a ring press for adjusting the contact surface pressure p (kg/cm$^2$) of the neighboring filtering ring 3 in the ring lamination 4.

Therefore, by driving the press drive 16, the pressing ring 12 acts on the upper end surface of the ring lamination 4, and causes the individual filtering rings 3 to closely adhere to each other under a prescribed pressure.

As a ring press, a press such as screw jack may be used in place of the above-mentioned press drive 16 and piston 14, and a prescribed pressing force is imparted to the pressing ring 12.

An object fluid supply, such as a supply-side pump 18, is connected via an inlet duct 17 to the inlet casing 6 forming the inlet area, and supplies an object fluid, for example, a liquid suspended substance, such as solid-liquid slurry material, to the inlet area. To the exit area, on the other hand, an object fluid press, such as a discharge-side pump 20, is connected via an exit duct 19. By adjusting the supply pressure P1 of the object fluid by the supply-side pump 18 and the suction pressure P2 of the discharge-side pump 20, the object fluid is pushed into gaps formed on the contact surfaces of the individual filtering rings 3 of the ring lamination 4 under the effect of the pressure difference between P1 and P2, i.e., $\Delta P = P1 - P2$. A solid-liquid pump (monopump) may be suitably used in this embodiment as the supply-side pump 18 and the discharge-side pump 20. GM in FIG. 1 designates gear motors for driving the pump 18 and 20 at the desired rotational speed.

As the object fluid press, an electric gate valve may be used in place of the above-mentioned pump 20. In this case, the same effects as in the case of the pump 20 can be achieved by adjusting the opening and closing of the gate valve.

While the filtering ring 3 is not limited to this, in this embodiment the filtering ring 3 has a flat ring shape, and the ring lamination 4 is formed by laminating, for example, 100 to 1,000 filtering rings 3. As described later in detail, in a preferred embodiment the ring lamination 4 is formed by laminating 160 to 800 filtering rings 3. The filtering ring 3 will be described later in detail.

Figure 2:
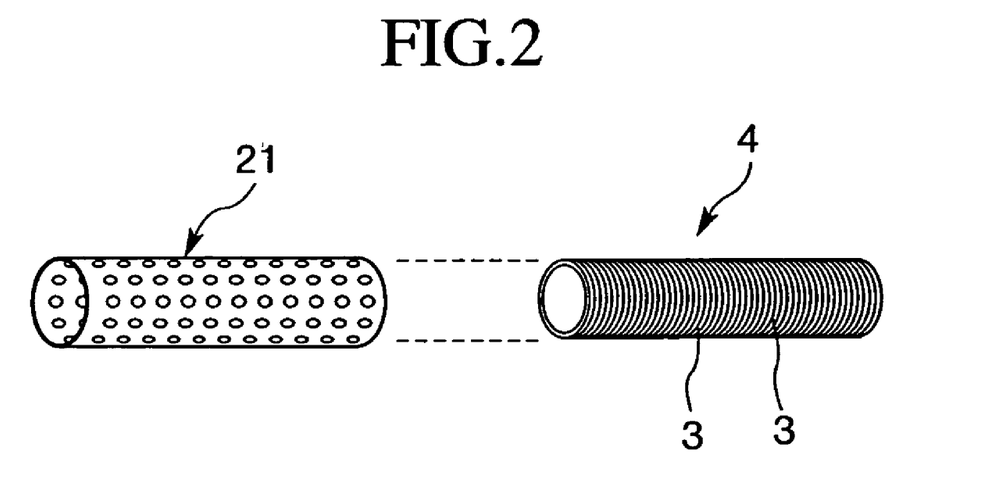
FIG. 2 is an exploded perspective view illustrating the relationship between the ring lamination and the inner casing.

In this embodiment, the ring lamination 4 is installed in the main body casing 5 by holding it within an inner casing 21 formed by a holder having a plurality of holes formed therein, or by a punched metal in this embodiment, as may be better understood by referring to FIG. 2. In this configuration, it is possible to prevent shaking of the filtering rings 3 in a direction perpendicular to the axial direction of the ring lamination 4, or in the horizontal transverse direction in this embodiment. On the other hand, each filtering ring 3 is made movable in the axial direction within the inner casing 21, or in the vertical direction in this embodiment. A glass fiber filter or a heat-resistant filter (not shown) may be provided, as required, between the inner casing 21 and the ring lamination 4.

A gap of a prescribed distance G is provided between the outer peripheral surface of the inner casing 21 and the inner peripheral surface of the main body casing 5, and forms an annular channel 23 for the flow of a separated fraction filtered and separated at the ring lamination 4 and flowing to the outer periphery of the ring lamination, such as purified water, to a drain port 22.

Figure 3:
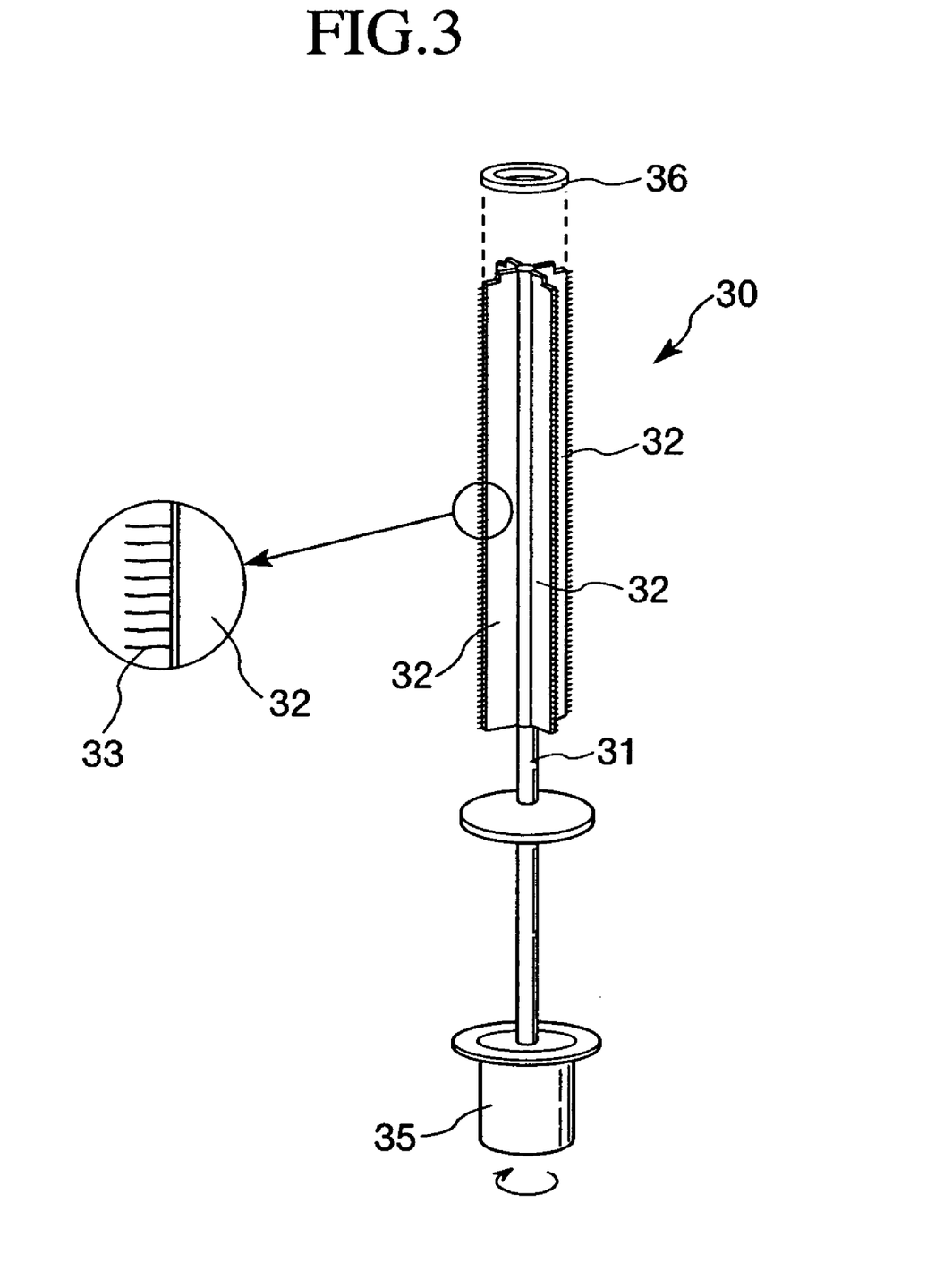
FIG. 3 is an exploded view of a stainless steel brush with a detail of the stripper wires.

According to this embodiment, stripper 30 for stripping off liquid-containing solids adhering to the inner periphery of the ring lamination 4 is arranged on the inner surface of the ring lamination 4. As shown in FIG. 3, the stripper 30 in this embodiment is, for example, an impeller having blades 32 arranged in a cross shape attached along the axial line of a rotation axis 31. Preferably, it should be a stainless steel brush comprising stainless steel wires 33 implanted at the outer tips of the crossed blades.

The rotation axis 31 of the stainless steel brush 30 has an end, the lower end in this embodiment, rotatably attached to the exit casing 7 via a bearing 34, and the lower end is connected to a rotation drive 35, such as an air motor arranged outside the housing 2. Therefore, by imparting a force to the rotation drive 35, the stainless steel brush 30 is rotatively driven. In this embodiment, the brush 30 is rotated in the counterclockwise direction as viewed from the air motor 35. The other end of the rotation axis 31, i.e., the upper end, is a free end engaged with a rolling preventing ring 36. The rolling preventing ring 36 is loosely engaged with an inner peripheral wall of the pressing ring 12 and inhibits rolling of the stainless steel brush 30 during rotation.

The structures of the filtering ring 3 and the ring lamination 4, which constitute the features of the present invention, will now be described.

Figure 4:
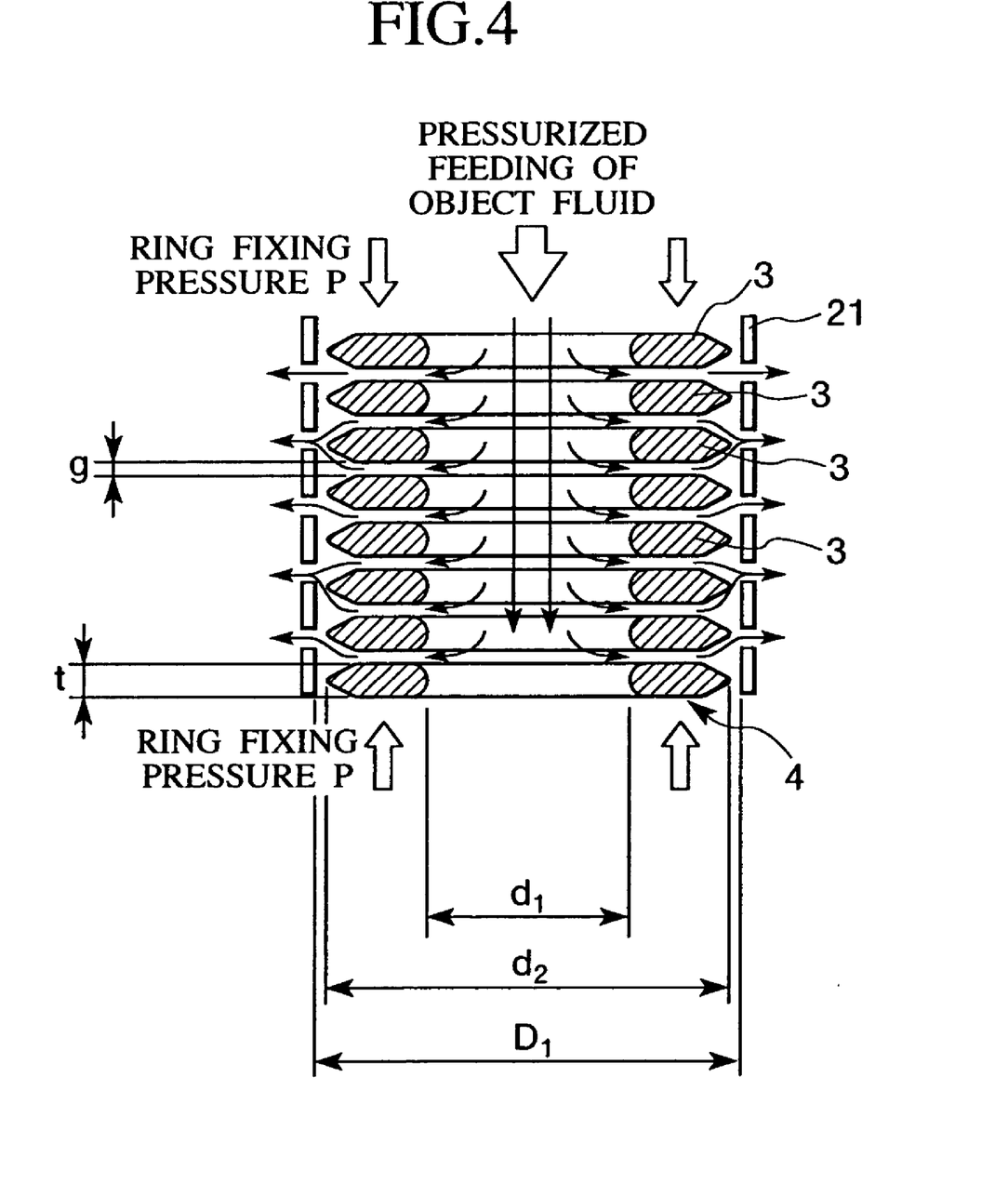
FIG. 4 is a schematic sectional diagram illustrating operation of the fluid treating apparatus of the present invention.
Figure 5:
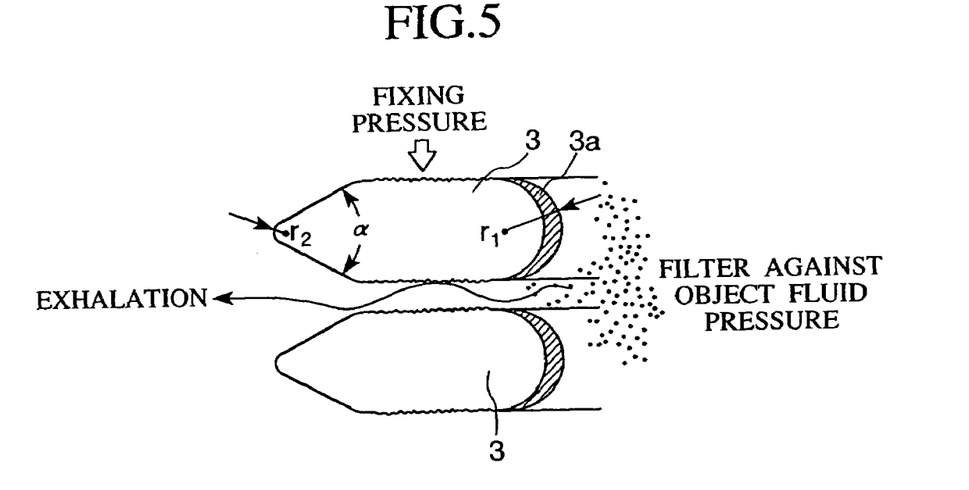
FIG. 5 is a schematic diagram illustrating the principle of filtering operation of the fluid treating apparatus of the invention.

As will be understood by referring to FIGS. 4 and 5, showing sectional views of the filtering ring 3, the filtering ring 3 in this embodiment is a flat ring having a thickness (t) and having a hole of an inside diameter (d1) at the center. The outside diameter (d2) of the ring 3 is slightly smaller than the inside diameter (D1) of the inner casing 21. For the inside diameter (d1), the outside diameter (d2) and the thickness (t) of the filtering ring 3, different dimensions may be adopted, depending upon the filtering capacity which the apparatus is required to have. Therefore, although the ring shape and size of the present invention are not limited to this, the ring 3 in this embodiment has an inside diameter (d1) of 136 mm, an outside diameter (d2) of 156 mm, and a thickness (t) of 5 mm, or 1 mm.

The inner periphery of the filtering ring 3 should preferably have a curved shape having a radius (r1). The outer periphery should preferably have a wedge shape converging toward the outside in the radial direction. The outermost periphery is curved with a radius (r2) formed so as to expand toward the inside in the radial direction at an angle ($\alpha$).

The filtering ring 3 should preferably be resistant to high temperatures of up to about 650° C. and to acids and alkalis. As described later, in order to improve filtering performance of the filtering ring 3, it is desirable that the inner periphery of the filtering ring 3 be magnetized upon use. Intensity of magnetization is appropriately selected, depending upon properties of the object fluid.

The material for the filtering ring 3 having the above-mentioned properties should preferably be a magnetic material. Applicable materials therefore include metals including particularly stainless steel, such as austenitic stainless steel (SUS 304). Stainless steel is generally non-magnetic. According to the results of experiments carried out by the present inventor, however, during the manufacturing process of filtering rings 3, it is heated to a high temperature in fusion cutting by laser at 1,630° C. As a result, a change in metallurgical structure (martensitic transformation) occurs at the inner periphery 3a of the filtering ring 3 as indicated by oblique lines in FIG. 5, converting the material into a paramagnetic material. After fabrication, magnetization was observed. Other applicable materials include titanium and alloys thereof, magnetic materials, such as steel, and mixtures of ceramics and various magnetic materials.

The principle of filtering operation of the filtering ring 3 of the present invention will now be described.

In the present invention, the finishing accuracy of at least the portions of the filtering rings 3 closely adhering to each other and facing each other is important. As a result of experimental research carried out by the present inventor, satisfactory results could be obtained for this portion with a surface roughness of about 0.01 to 20 µm in terms of Ra (center line average roughness). The lower limit value may be smaller than 0.01 µm, but the lower limit value Ra=0.01 µm is considered as a surface roughness actually achievable at the present level of the art. The upper limit value of the surface roughness of 20 µm is easily achievable with the present technology, and practicable. With a value over about 20 µm, on the other hand, the filtering capability of fine solid tends to be largely reduced. In order to maintain the same filtering capability as in the case of 20 µm, therefore, it is necessary to largely increase the ring pressing force as compared with the case of Ra lower than 20 µm, and this is not practicable.

As shown in FIGS. 4 and 5, a plurality of such filtering rings 3 are laminated so as to closely contact each other under a prescribed ring fixing pressure P, forming a ring lamination 4. In an experiment, a satisfactory result could be obtained in terms of this pressure P by setting a pressure p per unit area on the contact surface of each filtering ring 3, i.e., a contact surface pressure in a range of about 0 to 177 kg/cm$^2$. For example, in the case of dehydration of a solid-liquid slurry material, such as sewage, the contact surface pressure p may be in a range of about 7 to 80 kg/cm$^2$. In the case of a very small particle size of solids in a suspended material, or in the case of freshwater treatment of sea water, the pressure may be increased up to 177 kg/cm$^2$.

According to a measurement carried out by the present inventor, a satisfactory result could be obtained for the portions of the filtering rings 3 closely adhering to and facing each other with a gap distance (g) within a range of about 0.2 nm to 200 µm. For example, in the case of dehydration of a solid-liquid slurry material, such as sewage, the gap distance (g) may be in a range of about 20 µm to 200 µm. In the case of a very small particle size of the solids in a suspended material, or freshwater treatment of sea water, the gap distance (g) may be smaller than 0.1 µm, and practically, the gap distance (g) can be reduced to about 0.2 nm.

According to the result of an experiment carried out by the present inventor, contact surface pressures p of 177, 80, 40 and 20 kg/cm$^2$ lead to gap distances (g) of substantially 0.2 nm, 0.1 µm, 20 µm and 100 µm, respectively.

For the purpose of studying the filtering principle of the filter apparatus of the present invention, the present inventor manufactured a filter apparatus having a surface roughness Ra of 20 µm and a distance (g) of 40 µm between the portions of the filtering rings 3 adhering to each other and facing each other by the ring lamination 4. An aqueous solid-liquid suspension having a solid-liquid ratio of 1:3 and containing inorganic solids of a particle size in a range of about 0.5 to 50 µm was prepared and used as the object fluid.

As a result, purified water filtered and separated in the filter apparatus 1 was found not to contain solids having particles sizes of up to about 0.5 µm smaller than the gap distance (g). A further study revealed the following reason.

Fine particles having particle sizes up to about 0.5 µm smaller than the gap distance (g) in the suspension are subjected to the influence of Brownian motion, or viscosity resistance, and cannot therefore pass through gap paths having a gap distance (g) formed by neighboring filtering rings 3. More important is the fact that the inner periphery 3a, indicated by oblique lines in FIG. 5, of the filtering ring 3 used is magnetized. It is considered that the magnetic field exerts an effect on the inorganic fine particles and intensifies the so-called bridging phenomenon in which the inorganic fine particles adhere to the inner peripheral curved portion 3a of the filtering ring 3.

Operation of the filter apparatus having the above-mentioned configuration will now be described.

In this embodiment, as shown in FIG. 1, the press drive, i.e., the air cylinder 16, is started, and the pressing ring 12 is pressed against the ring lamination 4 by means of the piston 14. The individual filtering rings 3 composing the ring lamination 4 are caused to adhere to each other under a prescribed contact surface pressure p. This adjusts and sets the gap distance (g) between adjacent filtering rings of the ring lamination 4 to a prescribed value.

Then, the supply-side pump 18 is actuated, and an object fluid, such as a solid-liquid slurry material, is supplied under a pressure to the inlet area formed by the inlet casing 16. A de-aeration channel 25 is provided to appropriately perform de-aeration in the inlet casing 16. The object fluid flow channel 14a is formed inside the piston 14 arranged in the inlet casing 16, and the object fluid supplied to the inlet area is filled into the center hole and the exit area of the ring lamination 4. At the same time, the discharge-side pump 20 is activated.

The discharge-side pump 20 is first rotated in a direction counter to that during original discharge operation, and the object fluid in the ring lamination 4 is pressurized as in the case of the supply-side pump 18. Therefore, the object fluid is pressed against a flow channel having a gap (g) formed on the contact surface of each filtering ring 3 of the ring lamination 4 under the supply pressure of the object fluid imparted by the supply-side pump 18 and the counter-suction pressure (i.e., the pressing pressure) of the discharge-side pump 20. In this configuration, the first separated fraction, i.e., the solid fraction (sludge) does not pass through the flow channel between the individual filtering rings, but is directly accumulated on the center hole side of the ring lamination 4. The second separated fraction, which is the liquid fraction (freshwater) in this embodiment, flows through the gap channel between the filtering channels, passes through a hole formed in the inner casing 21, and outflows to an annular channel 23 formed between the inner casing 21 and the housing 2.

Upon generation of a certain pressure, the object fluid is pushed against the flow channel of the gap (g) formed on the contact surface of each filtering ring 3 of the ring lamination 4 under the supply pressure P1 of the object fluid imparted by the supply-side pump 18 and the suction pressure P2 of the discharge-side pump 20, i.e., under $\Delta P=P1-P2$, while operating the discharge-side pump 20 in the positive direction. The object fluid is separated into a first separated fraction and a second separated fraction as described above. The first separated fraction, i.e., solids (sludge) having fine particles in size larger than a prescribed particle size in this embodiment does not flow through the gaps between the filtering rings, but is accumulated in the center hole of the ring lamination 4. Thereafter, these solids are directed by a stainless steel brush 30 toward the downstream side, i.e., to the exit casing 7, and sent to the collection tank in the form of dehydrated cakes by the discharge-side pump 20 via an exit pipe 19.

The second separated fraction, which is the liquid fraction (purified water) in this embodiment, flows out to the annular channel 23 and is discharged into a purified water tank as purified water from a drain port 22 provided at the lower end of the main body casing 5.

According to the filter apparatus 1 of this embodiment having the above-mentioned configuration and operating as described above, the filtering/separating accuracy and the treating speed can be changed through a change in pressure on the object fluid achieved by adjusting the supply pressure P1 of the object fluid imparted by the supply-side pump 18 and the suction pressure P2 given by the discharge-side pump 20.

Solids adhering to the inner peripheral wall of the ring lamination 4 and accumulated there are scraped off by the stainless steel brush 30. This prevents the gaps between the filtering rings from being clogged off by bridging of the solids.

In the filter apparatus 1 of this embodiment, for example, when heating the object fluid to 170° C. and held in the ring lamination 4 for 30 seconds, followed by pressurizing the object fluid under a pressure of at least 7 kg/cm², it is possible to remove water in cells through membrane breakage of organisms in the object fluid.

The filter apparatus 1 having the above-mentioned configuration of this embodiment is substantially free from clogging in the ring lamination 4. During a long service, however, clogging may occur. Upon occurrence of clogging, a backwashing operation is carried out.

More specifically, in FIG. 1, pressurizing air for backwashing is blown through an air supply port 26 provided in the main body casing 5 into the annular path 23 formed between the main body casing 5 and the inner casing 21. In this case, it is desirable to discontinue operation of the supply-side pump 18 for a prescribed period of time, for example, for several seconds.

Figure 6:
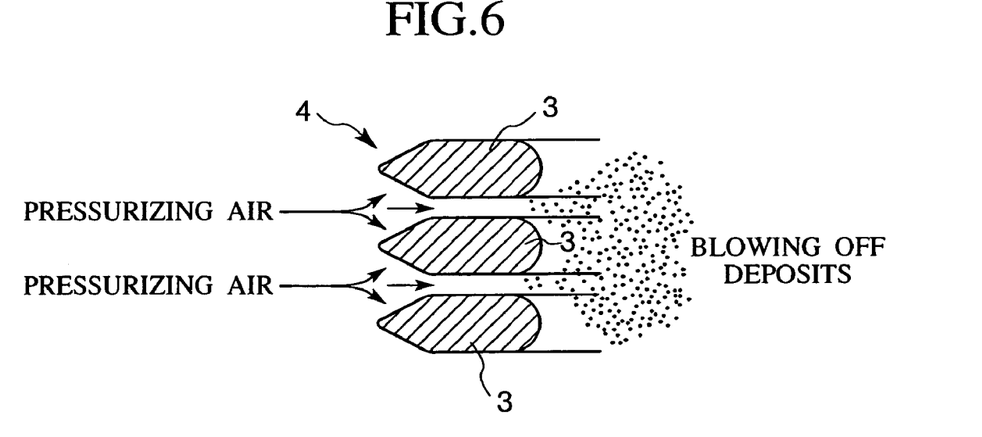
FIG. 6 is a schematic diagram illustrating a backwashing operation of the fluid treating apparatus of the invention.

As a result, as shown in FIG. 6, the pressurizing air blows off adhered fine particles causing clogging of the gaps between filtering rings in the radial direction toward the inside of the ring lamination 4, thus accomplishing backwashing. The pressure of the pressurizing air should preferably be in a range of about 7 to 15 kg/cm².

Since the filtering ring 3 of this embodiment has an outer periphery formed into a wedge shape, the pressurizing air tends to separate neighboring filtering rings 3 from each other. In the ring lamination 4, the gap distance (g) between neighboring rings becomes larger as compared with that during the filtering process, thus increasing the backwashing effect.

In a fluid treating apparatus conducting automatically controlled fluid treatment, the above-mentioned backwashing process may be periodically incorporated in the treating process.

The filter apparatus 1 of this embodiment is simple in structure. Clogging of the filter can therefore be easily eliminated.

Upon the completion of the backwashing operation, the supply-side pump 18 is started again to resume supply of the object fluid to the housing inlet area.

For the purpose of ascertaining advantages of the fluid treating method and the fluid treating apparatus of the present invention, a filter apparatus 1 having filtering rings 3 in size and shape shown in the following concrete example was manufactured and subjected to an experiment. The results showed a treating speed of 4,800 L (liters) per hour, a solid recovery rate of at least 99%, and a water content in the dehydrated cake of up to 85%.

CONCRETE EXAMPLE

Filtering Ring
   Material: Austenitic stainless steel (SUS304) or titanium
   Thickness (t): 5 mm (stainless steel) or 1 mm (titanium)
   Inside diameter (d1): 136 mm
   Outside diameter (d2): 156 mm
   Inner peripheral radius (r1): 3 mm
   Outer peripheral radius (r2): 1 mm
   Wedge angle (α): 60°
   Finishing accuracy (Ra): 20 μm Ring Lamination
   Number of filtering rings in lamination: 160 to 800 rings Operating Conditions
   Fixed ring pressure (contact surface pressure (p)): 8 to 177 kg/cm2
   Object fluid supply pressure P1: 10 to 60 kg/cm²
   Object fluid suction pressure P2: 10 to 60 kg/cm²
   Pressure during filtering ΔP: 10 to 60 kg/cm²

Properties of Object Fluid
   A water-containing suspension (solid-liquid slurry) having a solid-liquid ratio of 1:3, containing powdery inorganic solids of a particle size of about 0.5 to 50 μm was employed.

The fluid treating method and the fluid treating apparatus of the present invention is applicable, as described above, to dehydration of a liquid suspended material, such as a solid-liquid slurry material. They are also applicable to redehydration of cake produced from a conventional dehydrator. The present invention is applicable also in a scrubber washer or a coating booth waste liquid secondary dehydrating system. They are furthermore applicable in the manufacture of industrial water as recycled water and purified water, and also as a filtering apparatus for desalination of sea water.

The fluid treating method and the fluid treating apparatus of the present invention are applicable in desulfurization, or selection and classification of gases. For example, the method and the apparatus of the present invention are applicable in the form of an air filter apparatus for dust collection for purifying air in a clean room or a food plant using gas, such as air, as an object fluid. In this example, it is also necessary to perform removal and separation of soot and smoke, evaporated oil or an organic odor.

Figure 7:
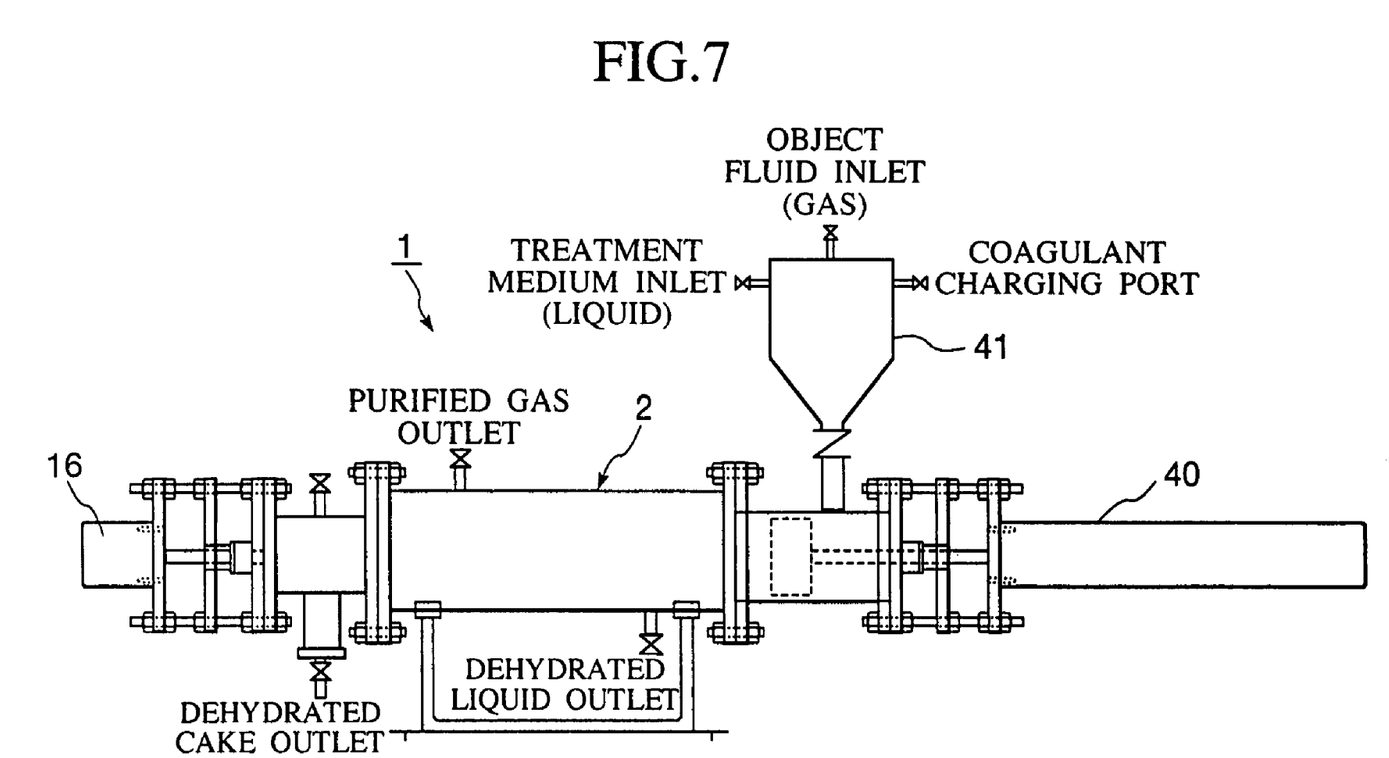
FIG. 7 is a schematic configuration diagram of another embodiment of the fluid treating apparatus of the invention.

In this embodiment, therefore, as shown in FIG. 7, a piston blower 40 is attached as an accessory to the fluid treating apparatus 1 of the present invention to appropriately adjust the amount of treated gas, and a tank chamber 41 is attached in response to the purpose of use. To wash off oils and bad odor in the open air with water and emulsify the same, a treating medium, such as water and a coagulant, are added in the tank chamber 41 to perform pretreatment of air which is the object fluid.

The pretreated air is introduced by the operation of the piston blower 40 into a housing 2 having a ring lamination 4 of the fluid treating apparatus 1 of the present invention, and is separated into purified gas (air), dehydrated cake (coagulated sludge of oils and odor of solidified substances) and a dehydrated liquid.

SECOND EMBODIMENT

Figure 8:
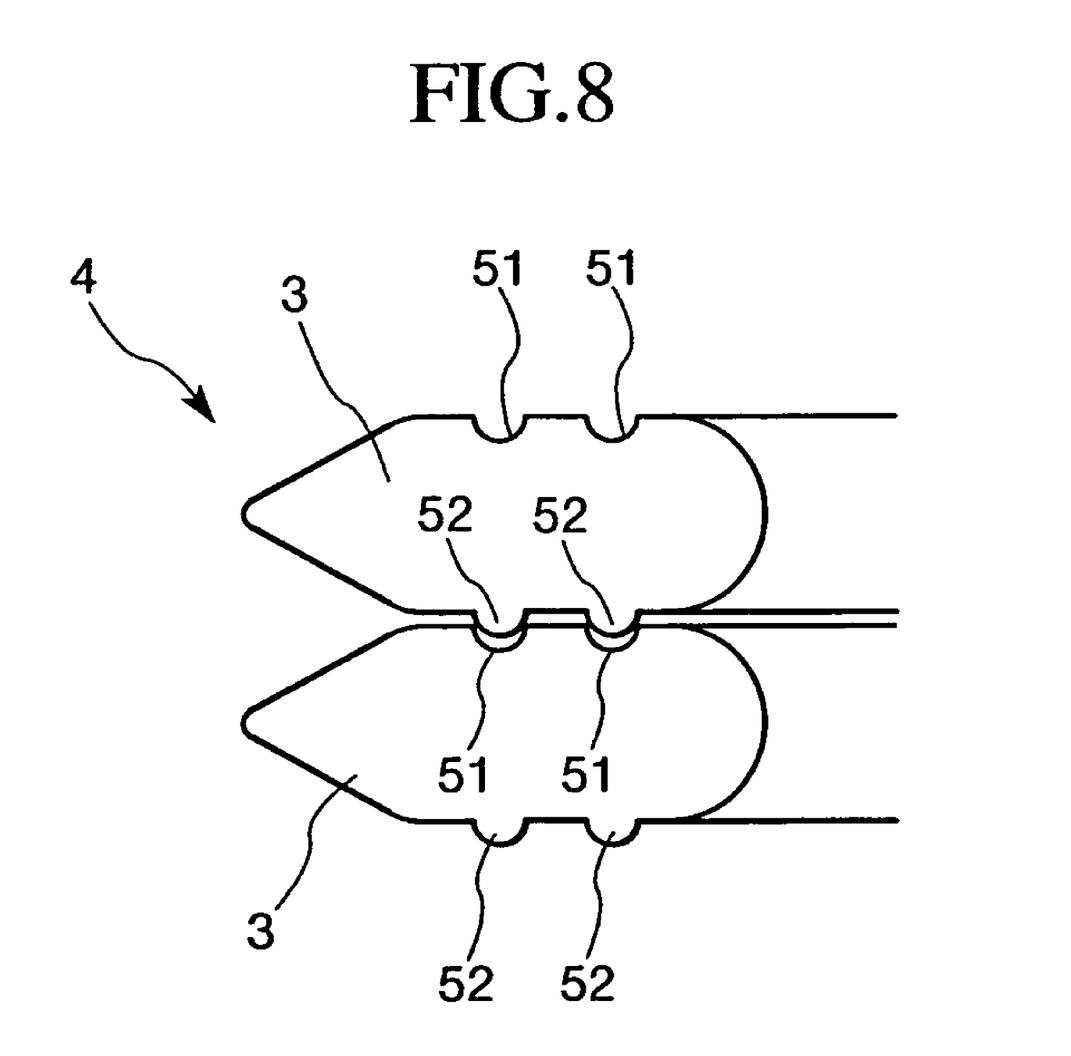
FIG. 8 is a schematic broken-away view illustrating another embodiment of the filtering ring.

Another embodiment of the filtering ring 3 is illustrated in FIG. 8. In the first embodiment, surfaces of the filtering rings 3 facing each other are flat. In the filtering rings 3 of the second embodiment, an annular concave groove 51 is formed on one surface, and an annular convex projection 52 capable of engaging with this concave groove 51 is formed on the other surface.

When laminating the filtering rings 3, therefore, in two neighboring filtering rings 3, the convex projection(s) 52 formed on one filtering ring can fit into the concave groove(s) 51 of the other filtering ring, thus extending the channel for object fluid formed by the neighboring filtering rings 3.

In this configuration, the pressure difference between the inside and outside of the ring lamination 4 becomes larger, thus resulting in improved separation accuracy.

When using filtering rings 3 of such a shape, the convex projection(s) 52 formed on one filtering ring 3 fit the concave groove(s) 51 of the other filtering ring 3, which solves the problem of transverse slip upon laminating the filtering rings 3. An available advantage is that the inner casing 21 which is necessary in the first embodiment is not necessary in the second embodiment.

It is therefore not necessary that the filtering ring 3 have a flat shape, and may have a three-dimensional shape. The three-dimensional shape is not limited to the above-mentioned shapes, but other various modifications can be adopted.

THIRD EMBODIMENT

Figure 9A:
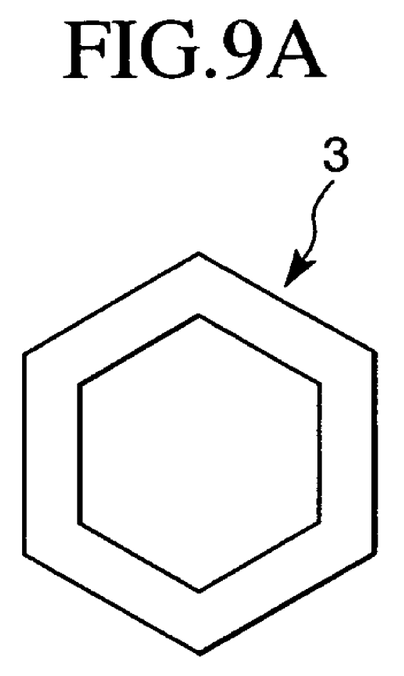
FIG. 9(A) is a plan view of still another embodiment of the filtering ring.
Figure 9B:
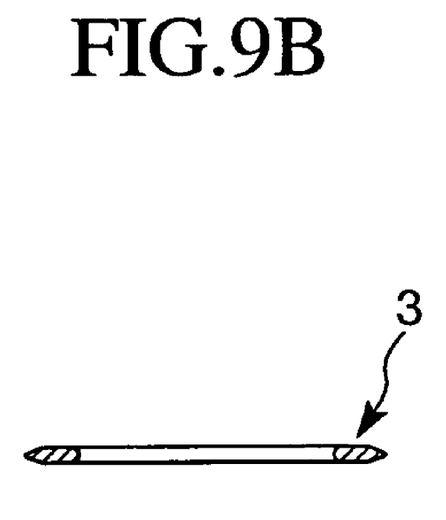
FIG. 9(B) is a side sectional view thereof.
Figure 10A:
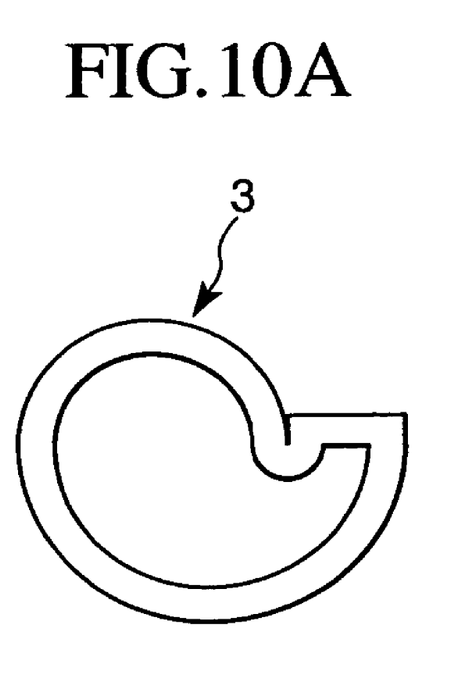
FIG. 10(A) is a plan view of further embodiment of the filtering ring.
Figure 10B:
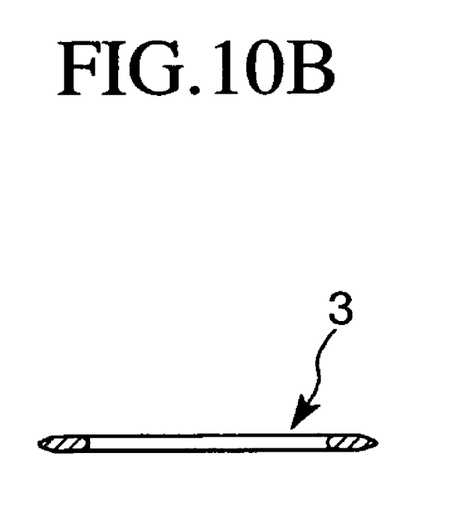
FIG. 10(B) is a side sectional view thereof.

FIG. 9 illustrates another embodiment of the filtering ring 3. In the first embodiment, the filtering ring 3 has a circular shape. It may have a rectangular shape, and as shown in FIG. 9, it may be hexagonal. Any of other different shapes may be adopted. For example, as shown in FIG. 10, it may have even a spiral shape.

INDUSTRIAL APPLICABILITY

As described above, the fluid treating method and the fluid treating apparatus of the present invention provide the following advantages:

(1) Provide high efficiency, and permit division of an object fluid into a first separated fraction and a second separated fraction for separation;

(2) Are resistant to high temperature and high pressure, and in addition, are resistant to acids and alkalis;

(3) Permit performance of backwashing by simple operation;

(4) Permit the possibility to set various target widths according to every purpose of use, ensuring multiple applications; and (5) Provide a simple mechanism and compact size, allowing space and energy saving, thus making it possible to reduce the equipment and running costs as compared with the conventional apparatus and methods.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A fluid treating method comprising the steps of:

(a) forming a ring lamination by laminating a plurality of filtering rings with contact surfaces facing each other in a laminating direction, each filtering ring comprising a non-porous metal plate having a central hole therein, the hole extending through the plate in the lamination direction, and each filtering ring having an inner periphery being convexly curved in a radially inward direction and an outer periphery having a wedge shape converging in a radially outward direction;

(b) providing at least portions of the contact surfaces of the filtering rings facing each other with a contact surface roughness (Ra) in a range of about 0.01 μm to 20 μm;

(c) pressing the ring lamination under a contact surface pressure (p) in a range of about 0 to 177 kg/cm² in the laminating direction of the filtering rings to cause the contact surfaces to closely adhere to each other, wherein a gap distance (g) between the portions of the filtering rings closely adhering to and facing each other is in a range of about 0.2 nm to 200 μm;

(d) directing an object fluid into an interior of the ring lamination via the central holes of the filtering rings, such that the object fluid enters radially outwardly into gaps formed by contact surfaces of adjacent filtering rings of the ring lamination;

(e) dividing the object fluid into a first separated fraction comprising solids and a second separated fraction comprising a fluid, such that the second separated fraction flows through the gaps for removal from an exterior of the ring lamination, while the first separated fraction accumulates on the inner periphery of the filtering rings; and (f) scraping the inner periphery of the filtering rings to remove the solids of the accumulated first separated fraction.

2. The fluid treating method according to claim 1, wherein the filtering rings comprise a magnetic material.

3. The fluid treating method according to claim 1, further comprising a step of controlling accuracy and/or speed of the division and separation of the object fluid into the first separated fraction and the second separated fraction by adjusting a pressure difference $\Delta P = P1 - P2$ between a supply pressure P1 of the object fluid acting on an inlet area of the ring lamination and a suction pressure P2 acting on an exit area of the ring lamination.

4. The fluid treating method according to claim 3, further comprising the steps of: causing the suction pressure acting on the exit area of the ring lamination to act in a reverse direction in an initial stage of operation, and pressing the object fluid radially into the ring lamination by the reverse suction pressure acting on the exit area of the ring lamination and the supply pressure of the object fluid acting on the inlet area of the ring lamination.

5. A fluid treating apparatus for dividing an object fluid into a first separated fraction and a second separated fraction and removing these fractions, comprising:
   a long and thin cylindrical housing;
   a ring lamination formed by laminating a plurality of filtering rings facing each other, each filtering ring comprising a non-porous metal plate having a central hole therein, the hole extending through the plate in the lamination direction, and each filtering ring having an inner periphery being convexly curved in a radially inward direction and an outer periphery having a wedge shape converging in a radially outward direction;
   a ring press for acting on the ring lamination to cause the filtering rings to closely adhere to each other under a pressure in a range of about 0 to 177 kg/cm$^2$, wherein a gap distance (g) between contact portions of the filtering rings adhering to and facing each other is in a range of about 0.2 nm to 200 µm;
   an object fluid supply for feeding the object fluid to an interior of the ring lamination;
   an object fluid pressure source for impressing a prescribed pressure onto the object fluid supplied to the ring lamination in cooperation with the object fluid supply; and
   a stripper arranged in a center hole in the ring lamination to remove one of the first and second fractions from the ring lamination.

6. The fluid treating apparatus according to claim 5, wherein the object fluid pressure source is a pump or a gate valve.

7. The fluid treating apparatus according to claim 5, wherein the filtering rings comprise a magnetic material.

8. The fluid treating apparatus according to claim 5, wherein the stripper is a rotary brush for removing separated solids adhering to an inner peripheral portion of the ring lamination.

9. The fluid treating apparatus according to claim 5, further comprising a ring lamination holder arranged in the housing, the holder having a plurality of openings and having the ring lamination arranged in an interior of the holder.

* * * * *